United States Patent
George

(10) Patent No.: US 6,419,561 B1
(45) Date of Patent: *Jul. 16, 2002

(54) METHOD AND APPARATUS FOR MAKING A CUTTING TOOL HAVING A PLURALITY OF MARGINS

(75) Inventor: Stephen M. George, North Augusta, SC (US)

(73) Assignee: Kennametal Inc., Latrobe, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/680,358

(22) Filed: Oct. 5, 2000

(51) Int. Cl.⁷ .............................................. B24B 19/04
(52) U.S. Cl. ......................................... 451/48; 451/548
(58) Field of Search ........................... 451/48, 47, 220, 451/541, 548

(56) References Cited

U.S. PATENT DOCUMENTS

| | | |
|---|---|---|
| 1,151,247 A | 8/1915 | Denk |
| 1,415,879 A | 5/1922 | Lacy |
| 1,466,378 A | 8/1923 | McLaughlin |
| 1,981,445 A | 11/1934 | Aker .............................. 51/95 |
| 2,477,730 A | 8/1949 | Fouquet ......................... 51/95 |
| 2,664,681 A | 1/1954 | Clark et al. .................... 51/283 |
| 2,972,839 A | 2/1961 | Erdélyi ......................... 51/124 |
| 3,212,167 A | 10/1965 | Connelly ...................... 29/103 |
| 4,442,637 A | * 4/1984 | Ahejew ......................... 451/48 |
| 4,744,705 A | 5/1988 | Imanaga ..................... 408/230 |
| 5,075,549 A | 12/1991 | Speiser et al. ................ 51/288 |
| 5,681,207 A | * 10/1997 | Nishida et al. ............... 451/47 |
| D415,774 S | 10/1999 | Wakai ........................ D15/139 |
| 6,089,337 A | 7/2000 | Kleine et al. ................ 175/394 |
| 6,113,321 A | 9/2000 | Mulroy et al. .............. 408/211 |
| 6,190,097 B1 | 2/2001 | Thomas ....................... 408/230 |

FOREIGN PATENT DOCUMENTS

| | | |
|---|---|---|
| FR | 919163 | 2/1947 |
| JP | 2000263307 | 9/2000 |
| RU | 948624 | 8/1972 |
| SU | 948624 | 8/1982 |

OTHER PUBLICATIONS

Related U. S. Application Serial No. 09/680,361, filed Oct. 5, 2000.
Related U. S. Application Serial No. 09/680,359, filed Oct. 5, 2000.
Related U. S. Design Application Serial No. 29/130,605, filed Oct. 5, 2000.
Article titled "A Mathematical Model of the Grinding Wheel Profile Required for a Specific Twist Drill Flute", from J. Machine Tool Design Res. vol. 22, pp 239–251, 1982.
Article titled On the design of Milling Cutters or Grinding wheels . . . A Cad Approach "Machine Tool Design and Research Conference", Proceedings of the Twenty–Fifth International, 7 pp., undated.
Article titled "Getting the "Hole" Answer" from Modern Machine Shop, dated Jun. 1985.
"Computer–Aided Modelling of the Fluting Process for Twist Drill Design and Manufacture", 6 pp., Annals of the CIRP vol. 47/1/1998.
Brooke Cutting Tools, Inc. Catalog "UD Twist Drills", 4 PP., undated.
SGS HI–PERCARB™ High Performance Carbide Drill Catalog EDP No. 00044 entitled "Increase production rates up to 12 times over conventional carbide drills", 4 pp., ©1998 SGS Tool Company.

* cited by examiner

Primary Examiner—Joseph J. Hail, III
Assistant Examiner—David B. Thomas
(74) Attorney, Agent, or Firm—Kevin P. Weldon

(57) ABSTRACT

A grinding wheel for producing a cutting tool having a flute and a land along with double margins which follow a helix angle is disclosed along with a method for using such a grinding wheel. Additionally, a crush roll for dressing such a grinding wheel is disclosed.

46 Claims, 8 Drawing Sheets

METHOD AND APPARATUS FOR MAKING A CUTTING TOOL HAVING A PLURALITY OF MARGINS

BACKGROUND OF THE INVENTION

1. Field of the Invention

This invention is directed to a method and apparatus for making a cutting tool having at least one helical flute and land and having at least two margins on the land. In particular, the invention is directed to a grinding wheel and method of using such a grinding wheel to produce both the flute and land portions of the cutting tool, including the two or more margins associated with the land.

This invention is also directed to a crush roll used to form such a grinding wheel.

2. Description of the Related Art

A cutting tool, such as a twist drill, is generally comprised of a cylindrical shaft having at least one flute and land, wherein the flute and the land follow a helical angle to a forward cutting edge of the forward end of the shaft. The flute has associated with it a lip and an adjacent nose. The land has associated with it a clearance portion and a margin adjacent to the clearance portion. A side cutting edge is defined by the intersection of the lip with the margin of the land. Associated with the land of the cutting tool may be a single margin or, in some instances, a double margin wherein one margin is on each side of the land. In the past, production of such a cutting tool having both a helical flute and land with a margin required two separate grinding operations. In one operation, the flute would be ground with one grinding wheel, and in a separate operation the land would be ground with a second grinding wheel.

These two separate grinding operations require mounting the cutting tool on two separate grinding machines. Therefore, the cutting tool must be precisely mounted within each grinding machine to ensure the flute and land are ground along the same helical path. Additionally, the grinding machines must be set at the same lead angle to ensure the flute and land are ground along the same helix angle. If the cutting tool is not properly mounted and the flute and land are not ground correctly, the tool may be flawed such that it must be discarded. Furthermore, setup for two separate operations is not only time-consuming but also prone to error. Therefore, while the cutting tool could be ground using two grinding operations, a single grinding operation would be preferred.

A need exists to eliminate the need for two separate grinding operations to produce a drill having a plurality of margins through the use of a single grinding wheel and a method for using the same.

Finally, such a grinding wheel may be produced using single point dressing tools or CNC machines. However, each of these methods is time-consuming and expensive. As a result, a method and apparatus is desired for producing such a grinding wheel in a more efficient manner.

BRIEF SUMMARY OF THE INVENTION

The invention is directed to a grinding wheel for producing a helical cutting tool with a longitudinal axis, wherein the cutting tool shaft has a forward end and, when viewed in cross-section perpendicular to the longitudinal axis and spaced from the forward end, the cutting tool is comprised of a flute having a radial depth and a land adjacent to the flute, wherein the flute and the land extend about the longitudinal axis of the shaft along a helix angle, and wherein the flute has a lip extending inwardly from an outer radius and a nose adjacent to the lip and wherein each land has a first margin adjacent to the nose. The cutting tool also has a clearance portion adjacent to the first margin and a second margin adjacent to the clearance portion. The grinding wheel is comprised of a disk having a disk centerline and an average radial size, a first side and a second side defining a width therebetween and a disk outer edge between the sides. The outer edge of the disk has an abrasive material for grinding a cutting tool. The edge has a profile defined by:

a) a lip shaper segment extending in a lateral direction from the first side and extending away from the disk centerline a radial distance defining the radial depth of the flute;

b) a nose shaper segment adjacent to the lip shaper segment and extending in a lateral direction toward the second side and extending inwardly toward the disk centerline;

c) a first margin relief shaper segment adjacent to the nose shaper segment and extending in a lateral direction toward the second side and extending away from the disk centerline;

d) a clearance shaper segment extending from the first margin relief shaper segment toward the second side; and e) a second margin relief shaper segment adjacent to the clearance shaper segment and extending in a lateral direction toward the second side and extending toward the disk centerline.

Another aspect of the invention is directed to a method of producing a helical cutting tool having a longitudinal axis, wherein the cutting tool shaft has a forward end and, when viewed in cross-section perpendicular to the longitudinal axis and spaced from the forward end, has a flute with a radial depth and has a land adjacent to the flute. The flute and the land extend about the longitudinal axis of the shaft along a helix angle. The flute has a lip extending inwardly from an outer radius and a nose adjacent to the lip. Each land has a first margin adjacent to the nose, a clearance portion adjacent to the first margin, and a second margin adjacent to the clearance portion. The method comprises the step of:

a) producing both the flute and land of the cutting tool by grinding the shaft with at least one pass of a grinding wheel.

Yet another aspect of the invention is directed to a cutting tool having a shaft with a longitudinal axis and a forward end and, when viewed in cross-section perpendicular to the longitudinal axis and spaced from the forward end, comprised of a flute having a radial depth and a land adjacent to the flute. The flute and land extend about the longitudinal axis of the shaft along a helix angle. The flute has a lip extending inwardly from an outer radius and a nose adjacent to the lip and wherein each land has a first margin adjacent to the nose, a clearance portion adjacent to the first margin and a second margin adjacent to the clearance portion. The cutting tool is produced with a method comprising the step of:

a) producing both the flute and land of the cutting tool by grinding the shaft with at least one pass of a single grinding wheel.

Yet another aspect of the invention is directed to a crush roll for dressing a grinding wheel, wherein the grinding wheel is used to produce a helical cutting tool having a shaft with a longitudinal axis. The cutting tool shaft has a forward end and, when viewed in cross-section perpendicular to the longitudinal axis and spaced from the forward end, is comprised of a flute having a radial depth and a land adjacent to the flute. The flute and the land extend about the longitudinal axis of the shaft along a helix angle and wherein the flute has a lip extending inwardly from an outer radius and a nose adjacent to the lip. Each land has a first margin adjacent to the nose, a clearance portion adjacent to the first margin, and a second margin adjacent to the clearance portion. The crush roll is comprised of a disk having a disk centerline and an average radial size, a first side and a second side defining a width therebetween and a disk outer edge between the sides, wherein the sides and edge have an abrasive material for dressing the grinding wheel. The edge has a profile defined by:

a) a lip former segment extending in a lateral direction from the first side and extending inwardly toward the disk centerline a radial distance equal to the radial depth of the flute;

b) a nose former segment adjacent to the lip shaper segment and extending in a lateral direction toward the second side and extending outwardly away from the disk centerline;

c) a first margin relief former segment adjacent to the nose former segment and extending in a lateral direction toward the second side and extending toward the disk centerline;

d) a clearance former segment extending from the first margin relief former segment toward the second side; and e) a second margin relief former segment adjacent to the clearance former segment and extending in a lateral direction toward the second side and extending away from the disk centerline.

DETAILED DESCRIPTION OF THE INVENTION

The Cutting Tool

Figure 1:
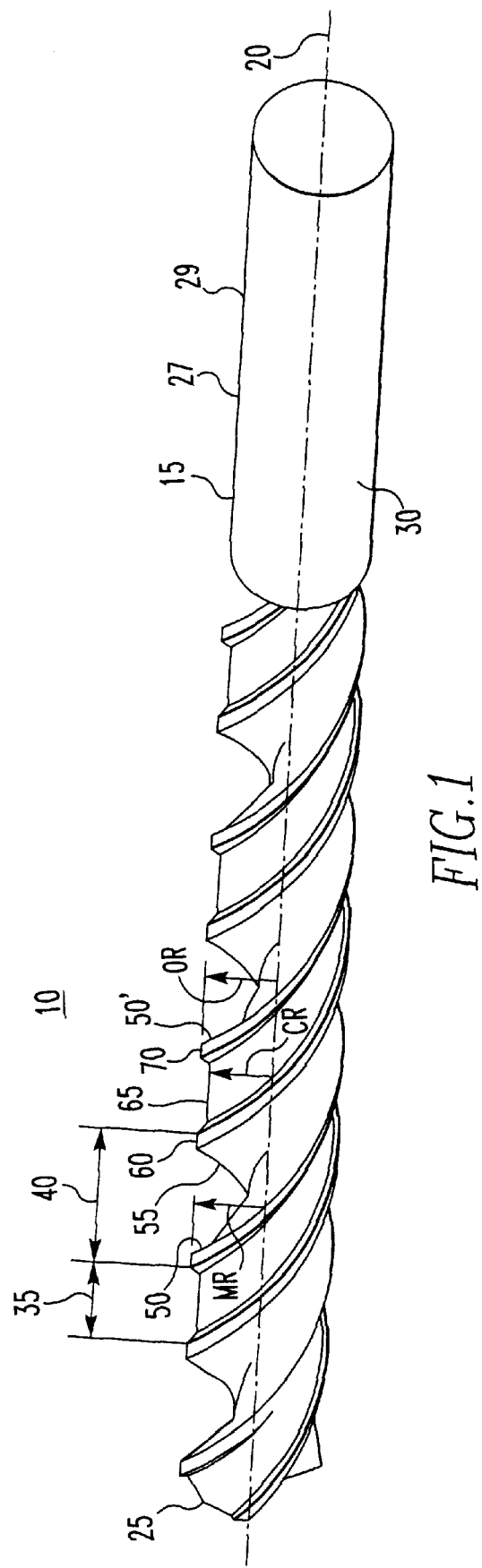
FIG. 1 illustrates an isometric view of a cutting tool having a double margin fabricated by the present invention.

The subject invention is directed to a method and apparatus for producing a cutting tool having a helical flute and land wherein the land has a margin on each side of the land. For purposes of explanation, a twist drill will be discussed, and such a drill having a margin at each side of the clearance is typically referred to as a double margin drill. However, it should be understood that the subject invention is applicable to other cutting tools having helical flutes such as, for example, endmills, taps, reamers and hobs. Such cutting tools may or may not have a forward end capable of contacting and cutting a workpiece. As a background, FIG. 1 shows a twist drill 10 having a generally cylindrical shaft 15 with a longitudinal axis 20. The shaft 15 has a forward end 25 capable of contacting and cutting a workpiece (not shown). The shaft has an external surface 30 wherein the external surface 30 has a flute 35 and a land 40 adjacent thereto.

At the rearward end 27 of the shaft 15 is a shank 29 which may be generally cylindrical or may have a non-cylindrical shape to fit within a chuck (not shown). While the shank 29 is illustrated as cylindrical, it should be clear that the shank may be square, hexagonal, conical or any other suitable non-cylindrical shape for gripping within a chuck. Additionally, when the shank 29 is cylindrical, it may have a radius greater to or less than the radius of the shaft 15.

Figures 2, 3:
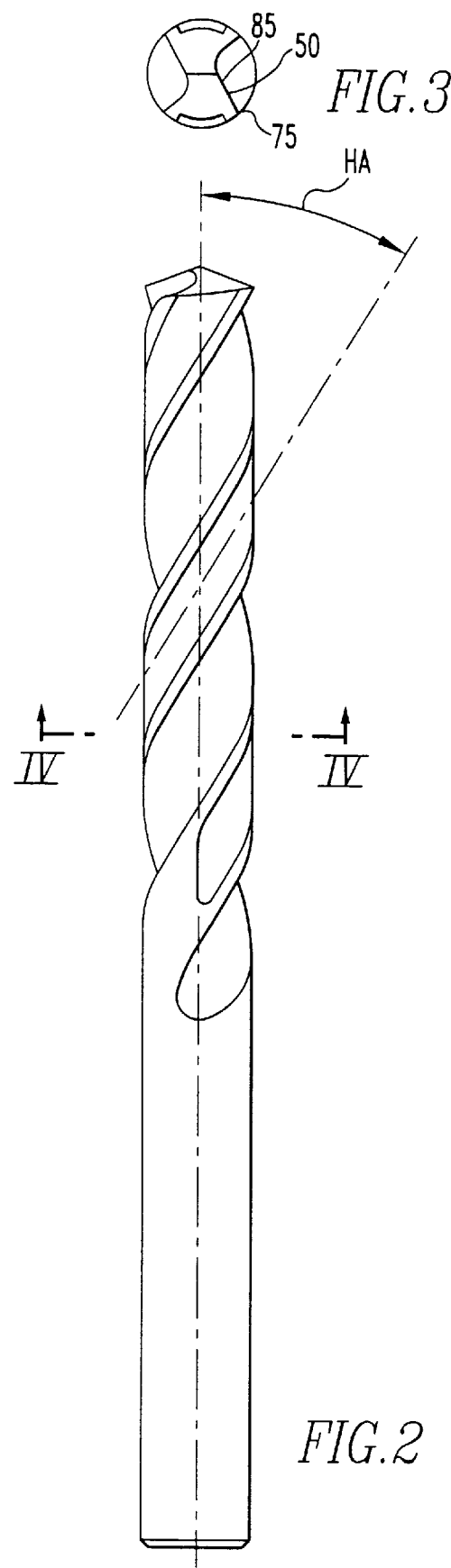
FIG. 2 is an elevation view of the cutting tool illustrated in FIG. 1.
FIG. 3 is a top view of the cutting tool illustrated in FIG. 2.

The flute 35 and the land 40 extend about the longitudinal axis 20 of the shaft 15 along a helix angle HA (FIG. 2). Directing attention to FIGS. 1–4, the flute 35 which has a radial depth 97 is comprised of a lip 50 extending inwardly from an outer radius OR and a nose 55 adjacent to the lip 50.

Figure 4:
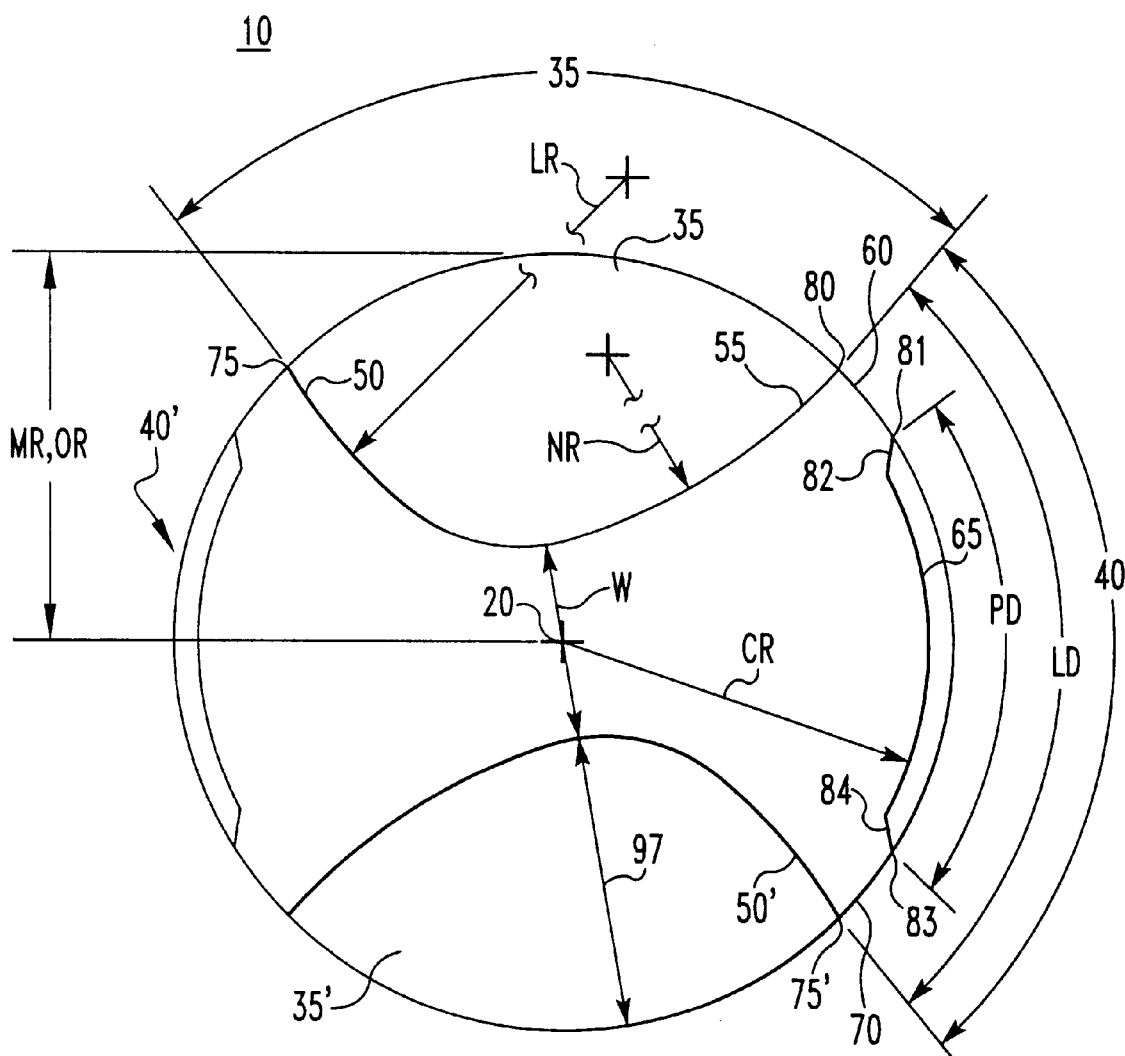
FIG. 4 is a section view along arrows IV—IV of FIG. 2.

The land 40 is adjacent to the flute 35 and extends about the longitudinal axis 20 along the helix angle HA a peripheral distance LD about the drill 10. The distance LD subtends an arc between 70° and 110°, and preferable about 90°. The land 40 has a first margin 60 with a radius MR equal to the outer radius OR. The land 40 also has a clearance portion 65 which is adjacent to the first margin 60 and is within an envelope circumscribed by the outer radius OR. In one embodiment illustrated in FIG. 1, the clearance portion 65 has a radius CR which is less than the outer radius OR. However, it may be possible for the clearance portion 65 to have a taper with a changing radius CR over its length. A second margin 70 is adjacent to the clearance portion 65. This describes the flute 35 and the land 40. Beyond the clearance portion 65 is a lip 50' which is associated with a different flute 35' and land 40' positioned in a different location along the shank 29 of the drill 10. In the event drill 10 had only a single flute, then flute 35' would be flute 35 rotated about the drill 10 a full revolution. In FIG. 4, because there are two flutes 35,35' and two lands 40, 40', the land 40 is adjacent to the lip 50' of an adjacent flute 35' and intersects to form side cutting edge 75'.

The drill illustrated in FIGS. 1–4 has two separate flutes and associated lands extending along its length. It should be appreciated that the double margin cutting tool, in this instance a double margin drill, may have a single flute or multiple flutes (e.g., two, three, four or more flutes) and associated lands.

Directing attention to FIG. 4, the smallest web thickness W of the drill 10 at the longitudinal axis 20 is less than the peripheral distance PD between the margins 60, 70 adjacent to the clearance portion 65. The peripheral distance PD along the clearance portion 65 begins at the edge 81 of the first margin relief portion 82 and subtends an arc of about 60° to the edge 83 second margin relief portion 84.

The smallest web thickness W of the shaft 15 may be between 30–70% of the peripheral distance PD along the clearance portion 65. The smallest web thickness W of the shaft 15 may also be between 25–70% of the outer radius OR and, in a preferred embodiment, may be approximately 50% of the outer radius OR.

In a preferred embodiment, the smallest web thickness W of the shaft 15 is approximately 36% of the clearance peripheral distance PD between first margin 60 and second margin 70.

The lip 50, illustrated in FIG. 4, is concave and has a radius LR. However, when viewed from the forward end 25 in FIG. 3, a projection 85 of the lip 50 is a straight line. In certain circumstances, the contour of this projection 85 may be curved, thereby providing a positive rake angle to the cutting edge 75 of the drill 10.

Returning to FIG. 4, the clearance portion 65 may be concentric with a clearance radius CR about the longitudinal axis 20, thereby providing structural support behind the cutting edge 75 at the margin 70. This feature is in contrast to a parabolic drill, which may have a clearance radius that decreases with peripheral distance away from the cutting edge 75.

At the transition between the first margin 60 and the clearance portion 65, the first margin relief portion 82 may be linear and ramped between the first margin 60 and the clearance portion 65 or, in the alternative, may be curved.

At the transition between the second margin 70 and the clearance portion 65, the second margin relief portion 84 may be linear and ramped between the second margin 70 and the clearance portion 65 or, in the alternative, may be curved.

As mentioned, FIGS. 1–4 illustrate a twist drill 10 having two flutes. It should be appreciated that drills manufactured using the method and apparatus of this invention are not limited to flutes and arrangements having a single flute. Multiple flutes may also be manufactured. In the event that additional flutes are included, then the twist drill will include additional flute/land pairs, wherein each pair extends along the longitudinal axis 20 of the shaft 15 and along the helix angle HA to form a plurality of flute/land pairs adjacent to one another along the drill shaft 15. One particular type of drill that may be fabricated in accordance with the subject method and apparatus of this invention may be a quarter-inch diameter drill having the following dimensions:

| | |
|---|---|
| helix angle (HA) = | 32.35° |
| outer radius (OR) = | 0.125 inch |
| nose radius (NR) = | 0.216 inch |
| clearance radius (CR) = | 0.118 inch |
| first margin radius (MR) = | 0.125 inch |
| second margin radius (MR) = | 0.125 inch |
| lip radius (LR) = | 0.225 inch |
| web thickness (W) = | 0.064 inch |

A Grinding Wheel for Producing the Cutting Tool

In the past, cutting tools having helical flutes and associated lands were commonly generated utilizing two separate grinding wheels and involved two separate grinding steps. As mentioned, not only were these two steps time-consuming, but proper alignment of the cutting tool after the first grinding operation was critical, such that the helical flutes and the associated lands would be parallel to one another. Absent this relationship, the cutting tool would be considered defective such that it must be discarded.

The inventor has designed a single grinding wheel capable of simultaneously generating both the helical flute and associated land on a cutting tool. This design not only permits cutting tools to be manufactured faster, but furthermore, improves the degree of accuracy with which the cutting tools are formed and eliminates scrap caused when the flute and the land are not parallel to one another.

Figure 5:
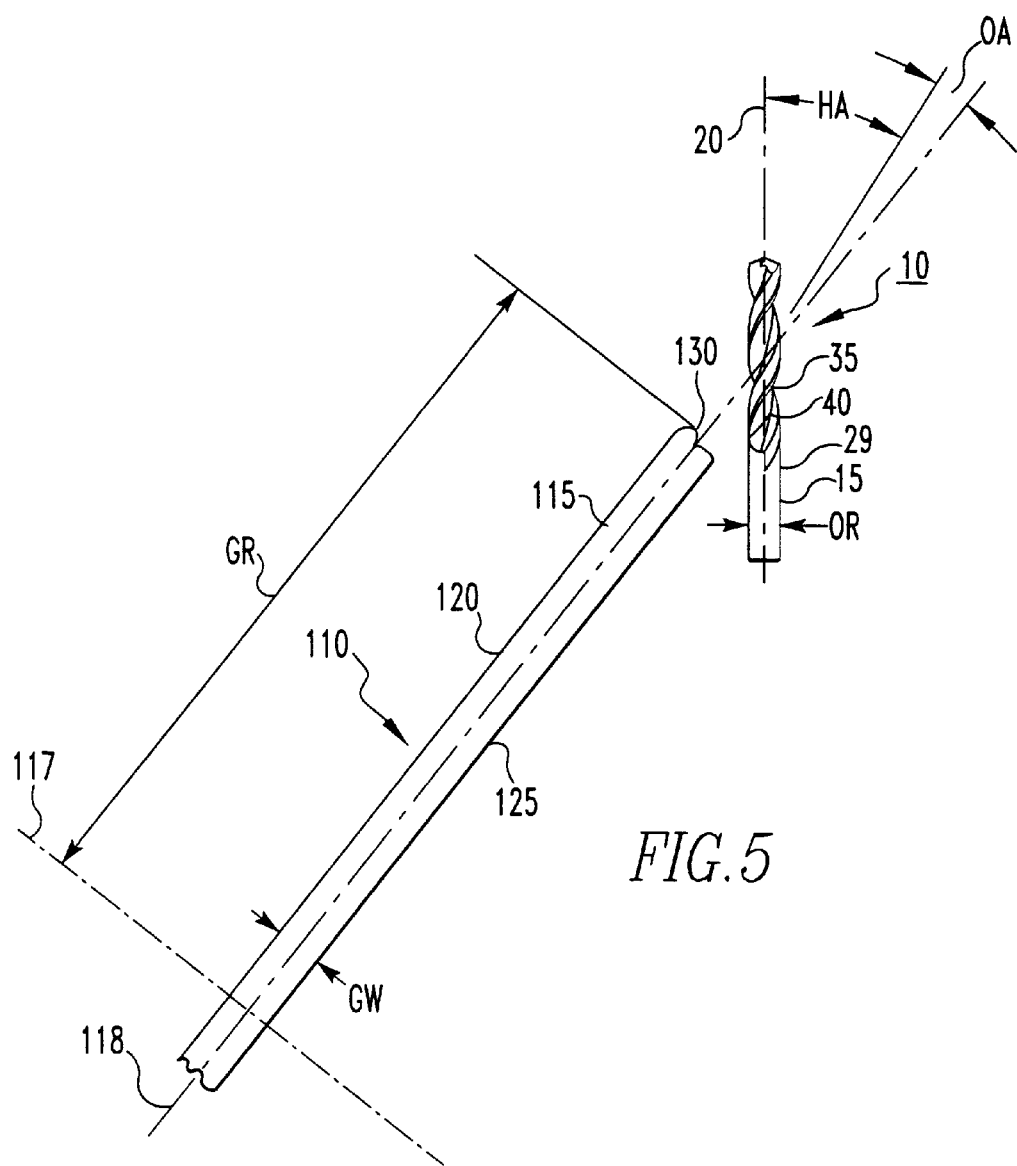
FIG. 5 is a sketch illustrating a view along the offset angle of a grinding wheel positioned adjacent to but spaced from a finished cutting tool.

FIG. 5 illustrates a grinding wheel 110 for producing the helical cutting tool 10 previously described. The grinding wheel 110 is comprised of a disk 115 having a disk centerline 117, a maximum radius GR and a longitudinal axis 118. The maximum radius GR also defines an average radial size. The disk 115 has a first side 120 and an opposing second side 125 defining a width GW therebetween. A disk outer edge 130 extends between the sides 120, 125. The outer edge 130 has an abrasive material thereupon for grinding a cutting tool 10. Such an abrasive material may be any of a number of typical materials used to grind metal, including but not limited to silicon carbide, cubic boron nitride, aluminum oxide or diamond. A typical grinding wheel may be fabricated of a resin-bonded material such as silicon carbide. Resin bond wheels are suitable for applications involving shock and deflection. Therefore, the structure is weak enough for them to work effectively on surface grinders with low speed and horsepower capabilities. Alternately, metal bond grinding wheels may also be used.

Figure 6:
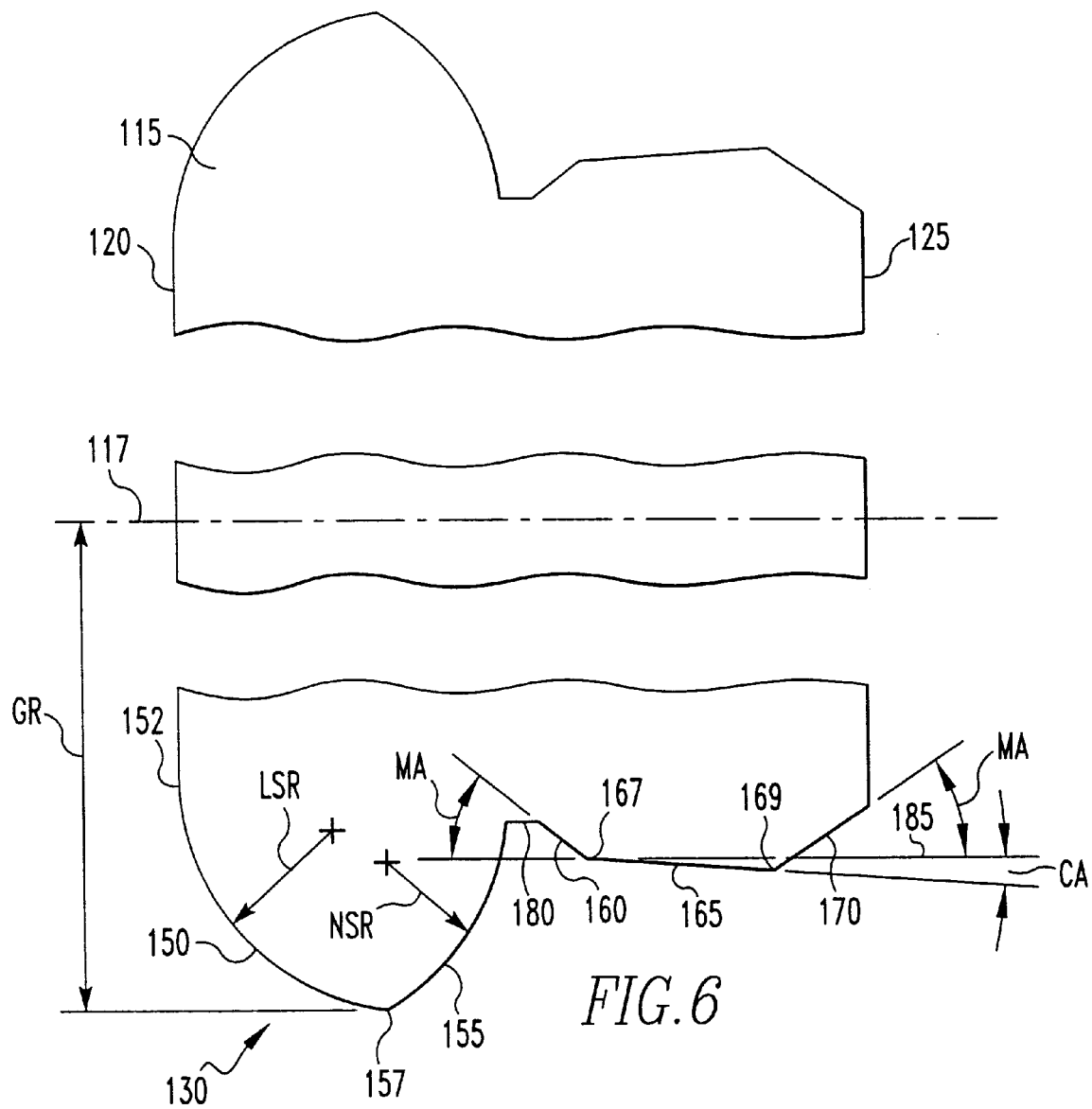
FIG. 6 illustrates a side view of the grinding wheel used to produce the cutting tool.

FIG. 6 illustrates a side view of a typical grinding wheel in accordance with the subject invention.

Certain portions of the edge 130 of the grinding wheel 110 are used to generate certain portions of the flute 35 and land 40 of the cutting tool 10, and for that reason the numbering for these particular items will be incremented by 100 from the associated part on the cutting tool 10.

The outer edge 130 is comprised of a lip shaper segment 150 extending in a lateral direction from the first side 120 and extending away from the disk centerline 117 a radial distance GR defining the radial depth 97 of the flute 35 (FIG. 4) to the outermost radial point 157.

A nose shaper segment 155 is adjacent to the lip shaper segment 150 and extends in a lateral direction toward the second side 125 and extends inwardly toward the disk centerline 117. Point 157 is also the point of intersection between the lip shaper segment 150 and the nose shaper segment 155.

A first margin relief shaper segment 160 is adjacent to the nose shaper segment 155 and extends in a lateral direction toward the second side 125 and furthermore extends away from the disk centerline 117.

A clearance shaper segment 165 extends from the first margin relief shaper segment 160 toward the second side 125.

Finally, a second margin relief shaper segment 170 is adjacent to the clearance shaper segment 165 and extends in a lateral direction toward the second side 125 and furthermore extends toward the disk centerline 117.

In one embodiment, the slope of the lip shaper segment 150 and the slope of the nose shaper segment 155 at their point of intersection 157 are not equal.

It is possible for a portion 152 of the lip shaper segment 150 closest to the first side 120 to be parallel to the first side 120. In general, for grinding wheels such as grinding wheel 110, it is typical for the first side 120 and the second side 125 to be straight and parallel to one another.

As illustrated in FIG. 6, the lip shaper segment 150 may have a convex shape. The lip shaper segment 150 may have a radius LSR of between 30–60% of the outer radius OR of the cutting tool 10. In the alternative, it is possible for the lip shaper segment 150 to be straight.

Additionally, as illustrated in FIG. 6, the nose shaper segment 155 may be convex. The nose shaper segment 155 may have a radius NSR of between 20–90% of the outer radius OR of the cutting tool 10. In the alternative, it is also possible for the nose shaper segment 155 to be straight.

Briefly returning to FIG. 1, it is typical in a cutting tool, such as the twist drill 10, for the first margin 60 and second margin 70 to have the largest radius of any part of the cutting tool 10. It is common for the radius of the first margin 60 and second margin 70 to have a radius identical to that of the shaft 15 which essentially may be the diameter of the original blank. Therefore, it is possible to produce the first margin 60 and the second margin 70 on the cutting tool 10 by shaping the areas adjacent to these margins and leaving the outermost surface of the margins untouched.

Returning attention to FIG. 6, a transition segment 180 may extend from the nose shaper segment 155 to the first margin relief shaper segment 160 wherein the transition segment 180 is spaced inwardly from the outermost point 157 of the disk 115 a distance greater than the depth 97 of the flute 35. In this fashion, the transition segment 180 is spaced from the outermost surface of the cutting tool 10 and does not contact the external surface 30.

The first margin relief shaper segment 160, as illustrated in FIG. 6, may be straight. However, in the alternative, the first margin relief shaper segment 160 may be convex and have a radius of between 80–160% of the outer radius OR of the cutting tool 10. Additionally, the second margin relief shaper segment 170, as illustrated in FIG. 6, may be straight. However, in the alternative, the second margin relief shaper segment 170 may be convex and have a radius of between 80–160% of the outer radius OR of the cutting tool 10.

The clearance shaper segment 165 is bounded by two end points 167 and 169. A line connecting these two end points 167, 169 of the clearance shaper segment 165 defines a clearance angle CA of preferably between 0–15° with a line 185 parallel to the centerline 117 of the disk 115. In one embodiment, for a wheel having a radius GR of 9 inches, a typical clearance angle CA would be 10°.

The clearance shaper 165 may be straight or curved. In the event it is curved, it may be convex in shape and have a radius of between 8 to 50 times the outer radius OR of the cutting tool 10.

The first margin relief shaper segment 160 and the second margin relief shaper segment 170, as illustrated in FIG. 6, are angled relative to the centerline 117. In particular, the first margin relief shaper segment 160 may be linear and may form an angle MA with a line 185 parallel to the disk centerline 117 of between 30°–90°. Additionally, the second margin relief shaper segment 170 may be linear and form an angle MA with a line 185 parallel to the disk centerline 117 of between 30°–90°. The margin relief shaper segments 160, 170 provide relief to the respective margins and for that reason these angles should preferably be selected to provide relief on each margin that is symmetric. It should be noted, however, that each of the first margin relief shaper segment 160 and the second margin relief shaper segment 170 may be convex, concave or straight, depending upon the desired transition between the clearance portion and the respective margins on the cutting tool.

In yet another embodiment, the disk outer edge 130 may further include a fillet shaper segment (not shown) centered about one or both of the end points 167, 169 of the clearance shaper segment whereby the fillet shaper segments may have a convex shape extending between the clearance shaper segment 165 and the respective margin shaper segment 160, 170.

In one embodiment of the subject invention, for the grinding of a quarter-inch drill, the grinding wheel 110 may have a radius GR of 8 inches and a width GW of 0.375 inch. The lip shaper segment 150 extends from the first side 120 and away from the longitudinal axis 118 and has a convex shape with a radius LSR of 0.135 inch wherein the beginning portion of the lip shaper segment 150 is tangent to the first side 120 of the wheel 110. The lip shaper segment 150 extends from the first side 120 a lateral distance of 0.114 inch. The nose shaper segment 155 is adjacent to the lip shaper segment 150 and extends toward the second side 125. The nose shaper segment 155 is convex with a radius of 0.136 inch. The nose shaper segment 155 extends to a point 0.179 inch laterally from the first side 120. A transition segment 180, which is linear, extends from the nose shaper segment 155 to the clearance shaper segment 160. The transition segment 180 is adjacent to the nose shaper segment 155 and extends a lateral distance of 0.018 inch in a direction away from the first side 120. The first margin relief shaper segment 160 is adjacent to the transition segment 180 and extends a lateral distance of 0.026 inch in a direction away from the first side 120 and extends radially away from the centerline 117 a distance of 0.020 inch. The clearance shaper segment 165 extends from the first margin relief shaper segment 160 a distance of 0.109 inch in a lateral direction away from the first side 120 and a radial distance of 0.004 inch away from the centerline 117. The second margin relief shaper segment 170 is adjacent to the clearance shaper segment 165 and extends in a direction away from the first side 120 a lateral distance of 0.043 inch and toward the centerline at an angle of 34° with a line parallel to the centerline 117.

Figure 7:
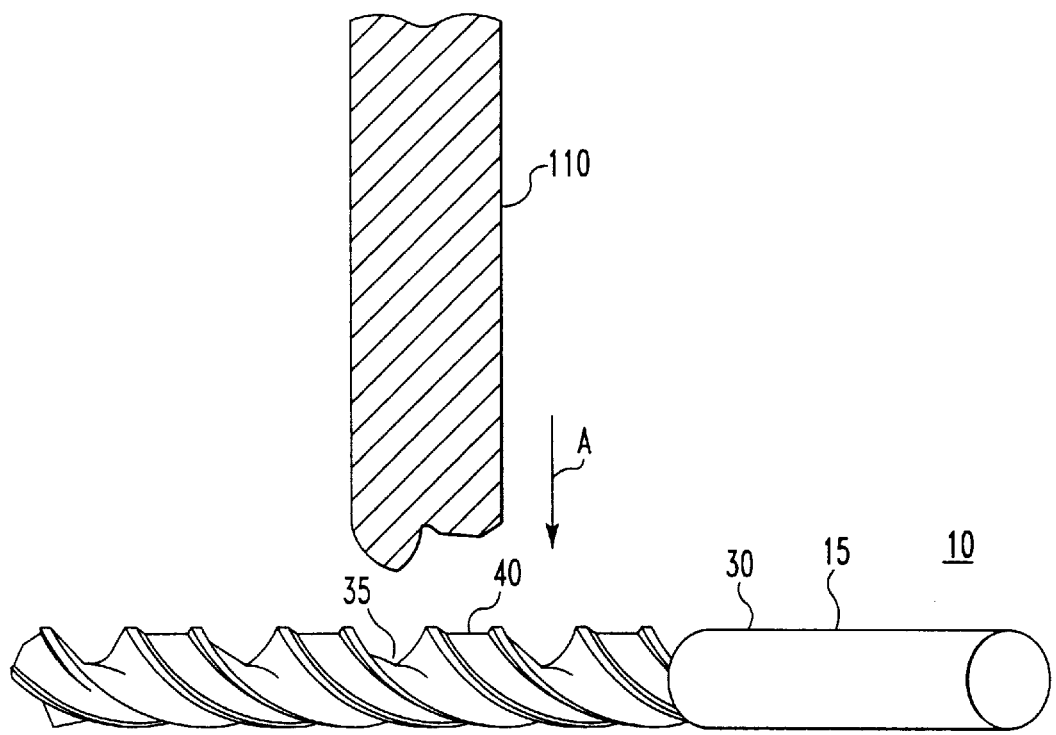
FIG. 7 illustrates a view along the offset angle of the grinding wheel and cutting tool of FIG. 5, spaced from one another to highlight their features.

FIG. 1 illustrates a perspective view of a drill that may be fabricated in accordance with the method and apparatus of the subject invention. FIG. 7 illustrates a view of the same drill with the grinding wheel 110 that may be utilized to produce the flute 35 and land 40 of that drill 10. For purposes of illustration, the grinding wheel 110 is spaced from the drill 10. However, the drill 10 is aligned properly such that lateral displacement of the grinding wheel 110 will properly position the grinding wheel 110 relative to the cutting tool 10. In actual operation, the grinding wheel 110 is advanced into the external surface of the drill 10 in the direction A illustrated in FIG. 7. However, it should be appreciated that prior to such advancement, the flute 35 and land 40 are not yet formed in the body of the drill 10 and resemble the portion of the cylindrical shaft 15 illustrated to the right in FIG. 7.

Figure 8:
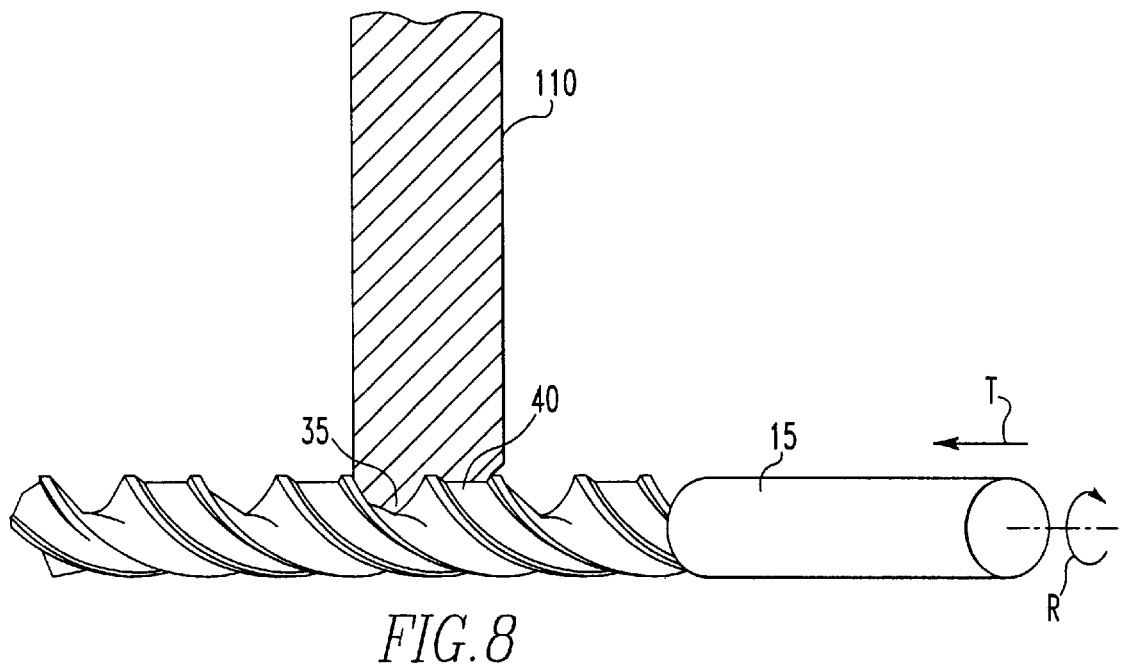
FIG. 8 illustrates a view along the offset angle of the grinding wheel and cutting tool of FIG. 5 contacting one another.

FIG. 8 illustrates the grinding wheel 110 positioned to fully grind the flute 35 and the land 40. During such an operation, the shaft 15 is rotated as illustrated by arrow R and is simultaneously translated in the direction indicated by arrow T while the grinding wheel 110 rotates, thereby permitting the grinding wheel 110 to impart a helical flute 35 and associated land 40 to the shaft 15.

Method of Producing Cutting Tool

Unlike previous techniques which required the utilization of two separate grinding wheels to create a helical flute and associated land, in one embodiment of the subject invention a single grinding wheel may be utilized to produce simultaneously both the flute and land with margins.

Figure 9:
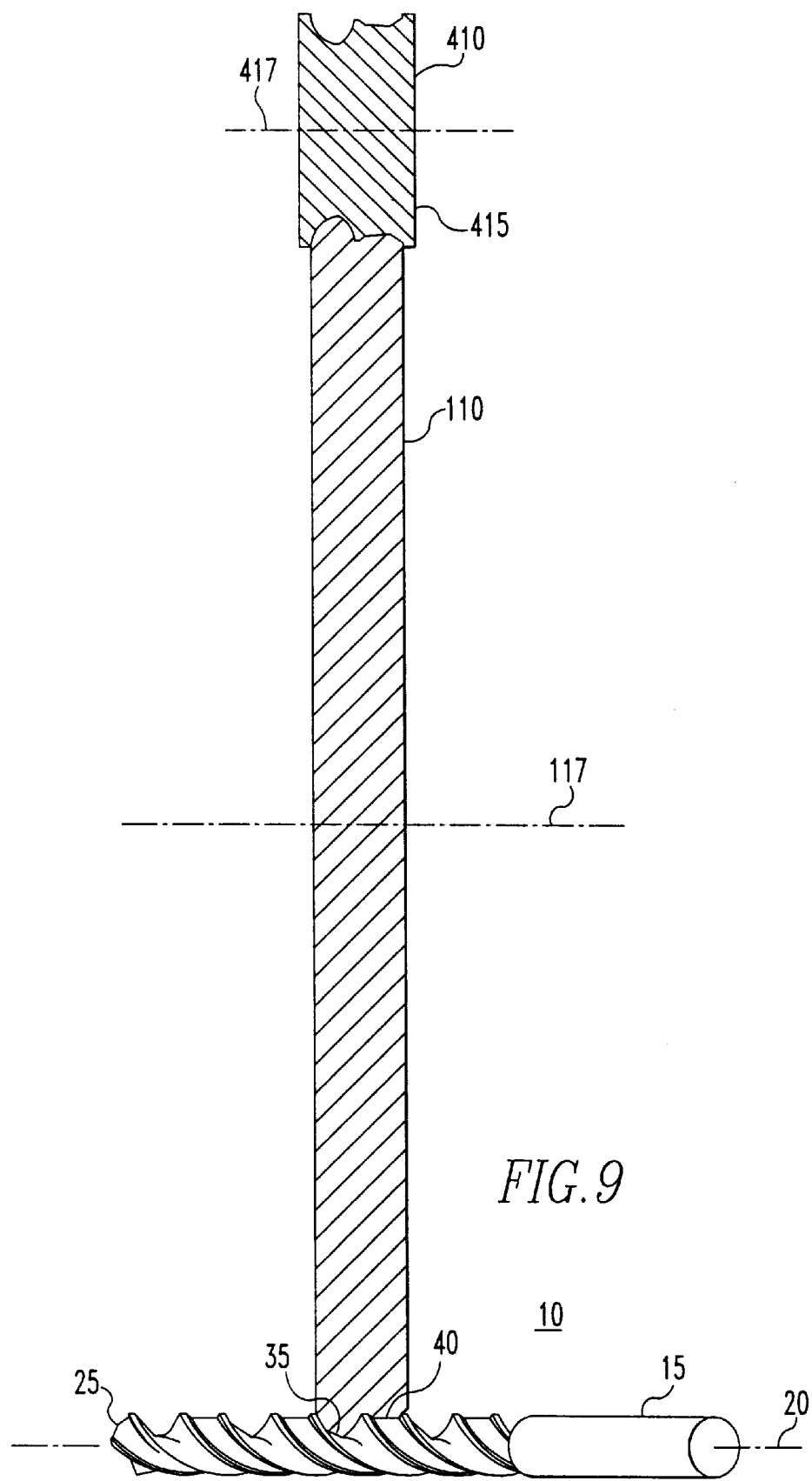
FIG. 9 illustrates a crush roll acting upon the grinding wheel to shape the wheel.

In particular, a further embodiment of the subject invention addresses such a method. With reference again to FIG. 1 and further attention to FIGS. 9–10, a method is disclosed for producing a cutting tool 10 having a shaft 15 with a longitudinal axis 20. The cutting tool 10 is identical to that previously described with respect to FIG. 1. The method of fabricating this cutting tool comprises the steps of producing a flute 35 and land 40 of the cutting tool 10 by grinding the shaft 15 with at least one pass of a grinding wheel 110.

In operation, a grinding wheel having a radius of 8 inches may be used to grind a drill having an outer radius or 0.25 inch. Under these circumstances, the grinding wheel may be rotated at a speed of between 1500–4000 RPM. At a speed of 2000 RPM, the drill may be axially fed (infeed) to the wheel at a rate of between 4–6 inches per minute. The helix angle typically is fixed for different grinding machines based upon the infeed rate and is a function of the rotational speed of the drill as it is fed to the wheel. However, other grinding machines may be adjusted to adjust the helix angle. Depending upon the power of the grinding machine, the grinding operation may be accomplished by a single pass of the grinding wheel at full depth or multiple passes with progressively greater depths.

As will be further discussed, a crush roll 410 having a mirror image of the outer edge 130 of the grinding wheel 110 may be urged against the grinding wheel 110, thereby imparting the shape of the crush roll 410 to the grinding wheel 110. This is especially beneficial in instances where the grinding wheel 110 is a resin-bonded grinding wheel which is flexible and, therefore, preferably must be frequently redressed.

Returning to FIG. 5, the flute 35 and land 40 extend around longitudinal axis 20 of the cutting tool 10 to define a helix angle HA which may preferably have a value of between 22°–38°. As further illustrated in FIG. 5, the radius GR of the grinding wheel 110 is significantly larger than the outer radius OR of the cutting tool 10 such that the grinding wheel 110 contacts the cutting tool 10 at a point where the grinding wheel 110 is tangent to the cutting tool 10 but furthermore at a location in front of and behind this tangency point. As a result, to better control the grinding process, the grinding wheel 110 is offset relative to a longitudinal axis 118 extending through the grinding wheel 110. The grinding wheel 110 may be offset at an angle OA relative to the helix angle HA by an amount between 3°–4°.

Cutting Tool Product by Process

What has been described so far is a grinding wheel for producing a fluted cutting tool and a method for producing such a cutting tool.

The general concept of producing a helical fluted cutting tool having a double margin utilizing a single grinding wheel is believed to be unique and, therefore, the product such as the double margin cutting tool discussed herein is also believed to be unique as a result of this process.

Crush Roll Apparatus

The perfect grinding wheel operating under ideal conditions will be self-sharpening, such that as the abrasive grains become dull, they tend to fracture and will be dislodged from the wheel by the grinding forces, thereby exposing new sharp abrasive grains. Although in precision machine grinding this ideal sometimes may be partially attained, it is almost never attained completely. Usually the grinding wheel must be dressed and trued after mounting on the precision grinding machine spindle and periodically thereafter. One device for providing this feature is a crush roll, which may be a hardened steel or carbide roll and which also may be impregnated with diamonds. The crush roll is free to rotate and has the desired form of the grinding wheel. The crush roll is fed gradually into the grinding wheel which runs at a slow speed. The crush roll will, by crushing action, produce its reverse form in the wheel. The crush roll produces a free cutting wheel face with sharp grains. The preferred method of dressing the grinding wheel 110 in accordance with the subject invention involves the use of a crush roll 410 illustrated in FIGS. 9 and 10.

As will be seen, the profile of the crush roll 410 is a mirror image of the outer edge 130 of the grinding wheel 110.

Directing attention again to FIGS. 9 and 10 and to FIG. 1 for the cutting tool details, a crush roll 410 for dressing a grinding wheel 110 is disclosed wherein the grinding wheel 110 is used to produce a helical cutting tool 10 as previously discussed.

The crush roll 410 is comprised of a disk 415 having a disk centerline 417 and an average radial size CRR. The disk 415 has a first side 420 and a second side 425 defining a width CW therebetween and a disk outer edge 430 between the sides 420, 425. The outer edge 430 has an abrasive material for dressing a grinding wheel 110 and has a profile. The profile is defined by a lip former segment 450 which may have a concave shape and extends in a lateral direction from the first side 420 and furthermore extends toward the disk centerline 417 a radial distance equal to the radial depth 97 (FIG. 4) of the flute 35. The profile further comprises a nose former segment 455 adjacent to the lip former segment 450 and extending in a lateral direction toward the second side 425 and further extending outwardly from the disk centerline 417. A first margin relief former segment 460 is adjacent to the nose former segment 455 and extends in a lateral direction toward the second side 425 and furthermore extends toward the disk centerline 417. A clearance former segment 465 extends from the first margin relief former segment 460 and extends toward the second side 425.

A second margin relief former segment 470 is adjacent to the clearance former segment 465 and extends in a lateral direction toward the second side 425 and furthermore extends away from the disk centerline 417.

Figure 10:
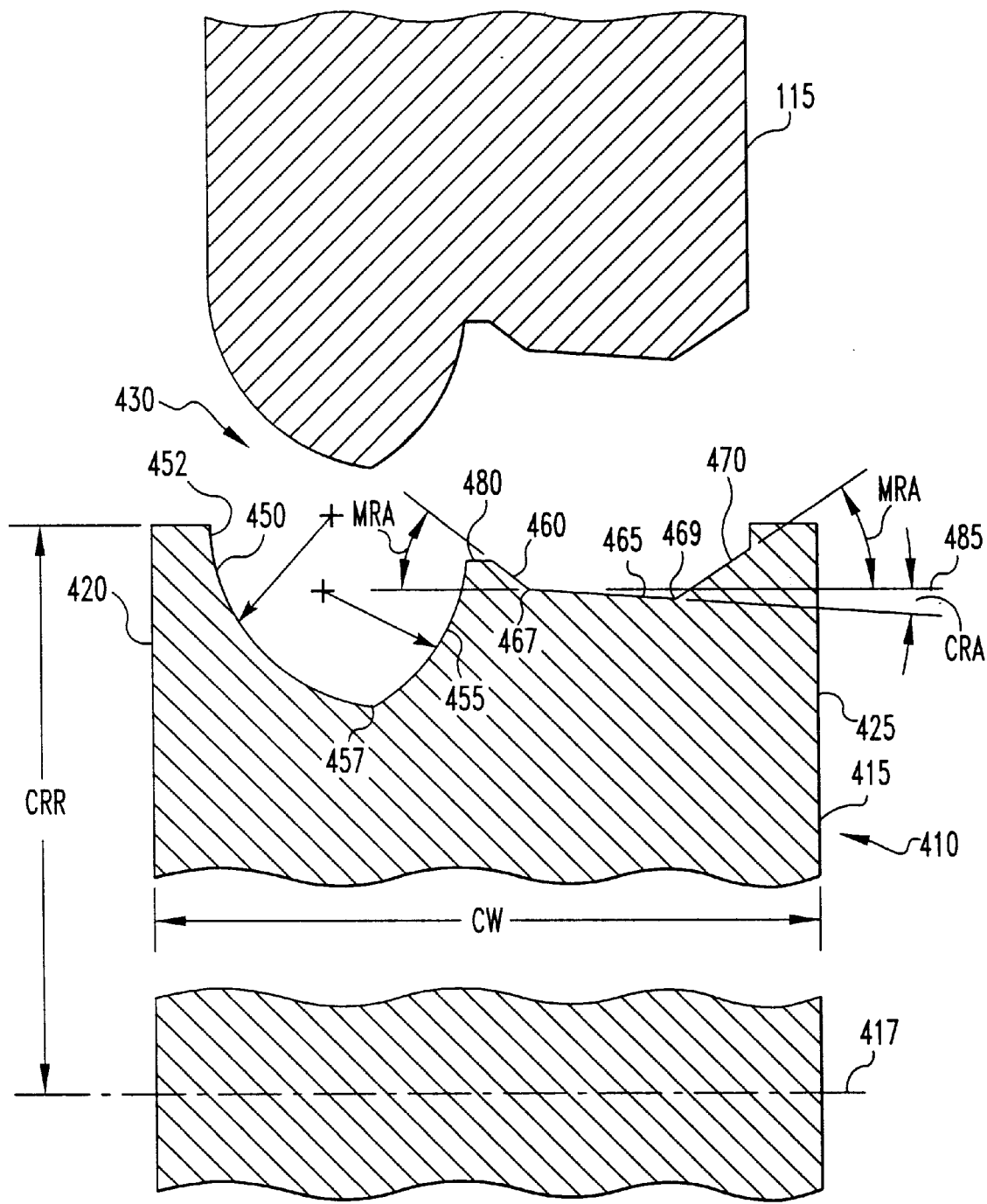
FIG. 10 illustrates the grinding wheel and crush roll of FIG. 9 spaced from one another to highlight their features.

As illustrated in FIG. 10, the profile of the outer edge 430 of the crush roll 410 is a mirror image of the outer edge 130 of the grinding wheel 110.

The slope of the lip former segment 450 and the slope of the nose former segment 455 at their point of intersection 457 may not be equal.

Additionally, a portion 452 of the lip former segment 450 closest to the first side 420 may be parallel to the first side 420. As illustrated in FIG. 10, the lip former segment 450 may have a concave shape. In particular, the lip former segment 450 may have a radius of between 30–60% of the outer radius OR of the cutting tool 10. In the alternative, the lip former segment 450 may be straight.

Additionally, the nose former segment 455 as illustrated in FIG. 10 may be concave. In such a case, the nose former segment 455 may have a radius of between 20–90% of the outer radius OR of the cutting tool 10. In the alternative, the nose former segment 455 may be straight.

As illustrated in FIG. 10, the first margin relief former segment 460 and the second margin relief former segment 470 are straight. In the alternative, one or both of the first margin relief former segment 460 and the second margin relief former segment 470 may be concave. Under such circumstances, one or both of these segments 460, 470 may have a radius of between 80–160% of the outer radius OR of the cutting tool 10.

When at least one of the first margin relief former segment 460 and the second margin relief former segment 470 is linear, then one or both may form an angle MRA with a line 485 parallel to the disk centerline 417 of between 30°–90°.

Directing attention to the clearance former segment 465, it is entirely possible for the segment, as illustrated in FIG. 10, to be straight. In the alternative, the clearance former segment 465 may be convex, having a radius of between 8 to 50 times the outer radius OR of the cutting tool 10. Additionally, whether the clearance former segment 465 is straight or curved, a line connecting two end points 467, 469 of the clearance former segment 465 defines a clearance angle CRA of between 0°–15° with a line 485 parallel to the centerline 417 of the disk 415.

As illustrated in FIG. 10, the crush roll 410 may also include a transition segment 480 between the nose former segment 455 and the first margin relief former segment 460 wherein the transition segment 480 is spaced radially from the outermost point of the disk 415 by a distance greater than the depth 97 (FIG. 4) of the cutting tool flute 35.

For a crush roll having an average radial size CRR of four inches, a preferred clearance angle CRA is 10°.

Just as the grinding wheel 110 may include a fillet shaper segment, so, too, may the crush roll 410 include a fillet former segment (not shown) having a concave shape and extending between the clearance former segment 465 and the first margin former segment 460 and between the second margin former segment 470 and the clearance former segment 465.

What has just been described is a single grinding wheel for producing a cutting tool having flutes along a helical axis and double margins, and a method for using such a grinding wheel. Finally, a crush roll used to dress the grinding wheel was disclosed.

The invention has been described with reference to the preferred embodiments. Obvious modifications and alterations will occur to others upon reading and understanding the preceding detailed description. It is intended that the invention be construed as including all such modifications and alterations insofar as they come within the scope of the appended claims or the equivalence thereof.

I claim:

1. A grinding wheel for producing a helical cutting tool with a longitudinal axis, wherein the cutting tool shaft has a forward end and, when viewed in cross-section perpendicular to the longitudinal axis and spaced from the forward end, is comprised of a flute having a radial depth and a land adjacent to the flute about the longitudinal axis of the shaft along a helix angle, wherein the flute has a lip extending inwardly from an outer radius and a nose adjacent to the lip and wherein each land has a first margin adjacent to the nose, a clearance portion adjacent to the first margin and a second margin adjacent to the clearance portion, wherein the grinding wheel is comprised of:

a disk having a disk centerline and an average radial size, a first side and a second side defining a width therebetween and a disk outer edge between the sides, wherein the outer edge has an abrasive material for grinding a cutting tool and wherein the edge has a profile defined by:
   a) a lip shaper segment extending in a lateral direction from the first side and extending away from the disk centerline a radial distance defining the radial depth of the flute;
   b) a nose shaper segment adjacent to the lip shaper segment and extending in a lateral direction toward the second side and extending inwardly toward the disk centerline;
   c) a first margin relief shaper segment adjacent to the nose shaper segment and extending in a lateral direction toward the second side and extending away from the disk centerline;
   d) a clearance shaper segment extending from the first margin relief shaper segment toward the second side; and
   e) a second margin relief shaper segment adjacent to the clearance shaper segment and extending in a lateral direction toward the second side and extending toward the disk centerline.

2. The grinding wheel according to claim 1 wherein the slope of the lip shaper segment and the slope of the nose shaper segment at their point of intersection are not equal.

3. The grinding wheel according to claim 1 wherein a portion of the lip shaper segment closest to the first side is parallel to the first side.

4. The grinding wheel according to claim 1 wherein the lip shaper segment has a convex shape.

5. The grinding wheel according to claim 4 wherein the lip shaper segment has a radius of between 30–60% of the outer radius.

6. The grinding wheel according to claim 1 wherein the lip shaper segment is straight.

7. The grinding wheel according to claim 1 wherein the nose shaper segment is convex.

8. The grinding wheel according to claim 7 wherein the nose shaper segment has a radius of between 20–90% of the outer radius.

9. The grinding wheel according to claim 1 wherein the nose shaper segment is straight.

10. The grinding wheel according to claim 1 wherein at least one of the first margin relief shaper segment and the second margin relief shaper segment is convex.

11. The grinding wheel according to claim 10 wherein at least one of the first margin relief shaper and the second margin relief shaper have a radius of between 80–160% of the outer radius.

12. The grinding wheel according to claim 1 wherein at least one of the first margin shaper segment and the second margin shaper segment is straight.

13. The grinding wheel according to claim 1 wherein at least one of the first margin relief shaper segment and the second margin relief shaper segment are linear and form an angle with a line parallel to the disk centerline of between 30°–90°.

14. The grinding wheel according to claim 1 wherein the clearance shaper segment is convex.

15. The grinding wheel according to claim 14 wherein the clearance shaper segment has a radius of between 8–50 times the outer radius.

16. The grinding wheel according to claim 1 wherein the clearance shaper segment is straight.

17. The grinding wheel according to claim 1 wherein a line connecting two end points of the clearance shaper segment defines a clearance angle of between 0–15° with a line parallel to the centerline of the disk.

18. The grinding wheel according to claim 1 further including a transition segment between the nose shaper segment and the first margin relief shaper segment, wherein the transition segment is spaced inwardly from the outermost point of the disk a distance greater than the depth of the cutting tool flute.

19. The grinding wheel according to claim 1 wherein at least one of the first relief margin and the second relief margin further include a fillet shaper segment having a convex shape located in the region adjacent to the clearance shaper segment.

20. A grinding wheel for producing a helical cutting tool with a longitudinal axis, wherein the cutting tool shaft has a forward end and, when viewed in cross-section perpendicular to the longitudinal axis and spaced from the forward end, is comprised of a flute having a radial depth and a land adjacent to the flute, wherein the flute and land extend about the longitudinal axis of the shaft along a helix angle, wherein the flute has a lip extending inwardly from an outer radius and a nose adjacent to the lip and wherein each land has a first margin adjacent to the nose, a clearance portion adjacent to the first margin and a second margin adjacent to the clearance portion, wherein the grinding wheel is comprised of:

a disk having a disk centerline and an average radial size, a first side and a second side defining a width therebetween and a disk outer edge between the sides, wherein the outer edge has an abrasive material for grinding a cutting tool and wherein the edge has a profile defined by:

a) a lip shaper segment extending in a lateral direction from the first side and extending away from the disk centerline a radial distance equal to the radial depth of the flute;

b) a nose shaper segment adjacent to the lip shaper segment and extending in a lateral direction toward the second side and extending inwardly toward the disk centerline;

c) a first margin relief shaper segment adjacent to the nose shaper and extending in a lateral direction toward the second side and extending away from the disk centerline;

d) a clearance shaper segment extending from the first margin relief shaper segment toward the second side, wherein a line connecting two end points of the clearance shaper segment defines a clearance angle of between 0°–15° with a line parallel to the centerline of the disk;

e) a second margin relief shaper segment adjacent to the clearance shaper segment and extending in a lateral direction toward the second side and extending toward the disk centerline; and f) wherein the slope of the lip shaper segment and the slope of the nose shaper segment at their point of intersection are not equal.

21. A method of producing a helical cutting tool having a longitudinal axis, wherein the cutting tool shaft has a forward end and, when viewed in cross-section perpendicular to the longitudinal axis and spaced from the forward end, has a flute with a radial depth and has a land adjacent to the flute, wherein the flute and the land extend about the longitudinal axis of the shaft along a helix angle and has a land adjacent to the flute, and wherein the flute has a lip extending inwardly from an outer radius and a nose adjacent to the lip and wherein each land has a first margin adjacent to the nose, a clearance portion adjacent to the first margin, and a second margin adjacent to the clearance portion, and wherein the method comprises the step of:

a) producing both the flute and land of the cutting tool by grinding the shaft with at least one pass of a grinding wheel.

22. The method according to claim 21 wherein producing both the flute and the land with the grinding wheel further includes urging the grinding wheel against a crush roll having a mirror image of the desired grinding wheel edge shape, thereby imparting the shape of the crush roll to the grinding wheel.

23. The method according to claim 21 wherein the helix angle of the cutting tool is between 22°–38° and wherein the grinding wheel is offset at an angle relative to the helix angle of between 3°–4°.

24. A method of producing a cutting tool having a longitudinal axis, wherein the cutting tool shaft has a forward end and, when viewed in cross-section perpendicular to the longitudinal axis and spaced from the forward end, has a flute with a radial depth and has a land adjacent to the flute, wherein the flute and the land extend about the longitudinal axis of the shaft along a helix angle and has a land adjacent to the flute, and wherein the flute has a lip extending inwardly from an outer radius and a nose adjacent to the lip and wherein each land has a first margin adjacent to the nose, a clearance portion adjacent to the first margin and wherein the method comprises the steps of:

a) producing both the flute and land of the cutting tool by grinding the shaft with at least one pass of a single grinding wheel, and b) producing in the same at least one pass with the same grinding wheel a first margin relief segment between the first margin and the clearance portion and a second margin relief segment between the second margin and the clearance portion.

25. A cutting tool having a shaft with a longitudinal axis and a forward end and, when viewed in cross-section perpendicular to the longitudinal axis and spaced from the forward end, comprised of a flute having a radial depth and a land adjacent to the flute, wherein the flute and land extend about the longitudinal axis of the shaft along a helix angle, and wherein the flute has a lip extending inwardly from an outer radius and a nose adjacent to the lip and wherein each land has a first margin adjacent to the nose, a clearance portion adjacent to the first margin and a second margin adjacent to the clearance portion, wherein the cutting tool is produced with a method comprising the step of:

a) producing both the flute and land of the cutting tool by grinding the shaft with at least one pass of a grinding wheel.

26. The cutting tool produced according to the method of claim 25, wherein the method further comprises the step of:

b) producing in the at least one pass with the same grinding wheel a first margin relief segment between the first margin and the clearance portion and a second margin relief segment between the second margin and the clearance portion.

27. A crush roll for dressing a grinding wheel, wherein the grinding wheel is used to produce a helical cutting tool having a shaft with a longitudinal axis, wherein the cutting tool shaft has a forward end and, when viewed in cross-section perpendicular to the longitudinal axis and spaced from the forward end, is comprised of a flute having a radial depth and a land adjacent to the flute, wherein the flute and the land extend about the longitudinal axis of the shaft along a helix angle and wherein the flute has a lip extending inwardly from an outer radius and a nose adjacent to the lip and wherein each land has a first margin adjacent to the nose, a clearance portion adjacent to the first margin and a second margin adjacent to the clearance portion, wherein the crush roll is comprised of:

a disk having a disk centerline and an average radial size, a first side and a second side defining a width therebetween and a disk outer edge between the sides, wherein the sides and edge have an abrasive material for dressing a grinding wheel and wherein the edge has a profile defined by:

a) a lip former segment having a concave shape and extending in a lateral direction from the first side and extending toward the disk centerline a radial distance equal to the radial depth of the flute;

b) a nose former segment adjacent to the lip shaper segment and extending in a lateral direction toward the second side and extending outwardly from the disk centerline;

c) a first margin relief former segment adjacent to the nose former segment and extending in a lateral direction toward the second side and extending toward the disk centerline;

d) a clearance former segment extending from the first margin relief former segment toward the second side; and e) a second margin relief former segment adjacent to the clearance former segment and extending in lateral direction toward the second side and extending away from the disk centerline.

28. The crush roll according to claim 27 wherein the slope of the lip former segment and the slope of the nose former segment at their point of intersection are not equal.

29. The crush roll according to claim 27 wherein a portion of the lip former segment closest to the first side is parallel to the first side.

30. The crush roll according to claim 27 wherein the lip former segment has a concave shape.

31. The crush roll according to claim 30 wherein the lip former segment has a radius of between 30–60% of the outer radius.

32. The crush roll according to claim 27 wherein the lip former segment is straight.

33. The crush roll according to claim 27 wherein the nose former segment is concave.

34. The crush roll according to claim 27 wherein the nose former segment has a radius of between 20–90% of the outer radius.

35. The crush roll according to claim 27 wherein the nose former segment is straight.

36. The crush roll according to claim 27 wherein at least one of the first margin relief former segment and the second margin relief former segment is concave.

37. The crush roll according to claim 36 wherein at least one of the first margin relief former segment and the second margin relief former segment have a radius of between 80–160% of the outer radius.

38. The crush roll according to claim 27 wherein at least one of the first margin former segment and the second margin former segment is straight.

39. The crush roll according to claim 27 wherein at least one of the first margin relief former segment and the second margin relief former segment are linear and form an angle with a line parallel to the disk centerline of between 30°–90°.

40. The crush roll according to claim 27 wherein the clearance former segment is convex.

41. The crush roll according to claim 40 wherein the clearance former segment has a radius of between 8–50 times the outer radius.

42. The crush roll according to claim 27 wherein the clearance former segment is straight.

43. The crush roll according to claim 27 wherein a line connecting two end points of the clearance former segment defines a clearance angle of between 0–15° with a line parallel to the centerline of the disk.

44. The crush roll according to claim 27 further including a transition segment between the nose former segment and the first margin relief former segment, wherein the transition segment is spaced inwardly from the outermost point of the disk a distance greater than the depth of the cutting tool flute.

45. The crush roll according to claim 27 wherein at least one of the first relief margin and the second relief margin further include a fillet former segment having a concave shape located in the region adjacent to the clearance former segment.

46. A crush roll for producing a helical cutting tool having a shaft with a longitudinal axis, wherein the cutting tool shaft has a forward end and, when viewed in cross-section perpendicular to the longitudinal axis and spaced from the forward end, is comprised of a flute having a radial depth and a land adjacent to the flute, wherein the flute and land extend about the longitudinal axis of the shaft along a helix angle, wherein the flute has a lip extending inwardly from an outer radius and a nose adjacent to the lip and wherein each land has a first margin adjacent to the nose, a clearance portion adjacent to the first margin and a second margin adjacent to the clearance portion, wherein the crush roll is comprised of:

a disk having a disk centerline and an average radial size, a first side and a second side defining a width therebetween and a disk outer edge between the sides, wherein the outer edge has an abrasive material for dressing a grinding wheel and wherein the edge has a profile defined by:

a) a lip former segment extending in a lateral direction from the first side and extending inwardly toward the disk centerline a radial distance equal to the radial depth of the flute;

b) a nose former segment adjacent to the lip former segment and extending in a lateral direction toward the second side and extending outwardly from the disk centerline;

c) a first margin relief former segment adjacent to the nose former and extending in a lateral direction toward the second side and extending away from the disk centerline;

d) a clearance former segment extending from the first margin relief former segment toward the second side, wherein a line connecting two end points of the clearance former segment defines a clearance angle of between 0–15° with a line parallel to the centerline of the disk;

e) a second margin relief former segment adjacent to the clearance former segment and extending in a lateral direction toward the second side and extending toward the disk centerline; and f) wherein the slope of the lip former segment and the slope of the nose former segment at their point of intersection are not equal.

* * * * *